United States Patent
Fox et al.

(10) Patent No.: US 11,801,599 B2
(45) Date of Patent: Oct. 31, 2023

(54) METHOD FOR DESIGNING SPECIAL FUNCTION ROBOTS

(71) Applicant: XTEND AI Inc., Middleburg, FL (US)

(72) Inventors: Harry Fox, Jerusalem (IL); Sergh Sapojnikov, Ashkelon (IL); Andrew C. Gorelick, Ashkelon (IL)

(73) Assignee: XTEND AI Inc., Middleburg, FL (US)

( * ) Notice: Subject to any disclaimer, the term of this patent is extended or adjusted under 35 U.S.C. 154(b) by 0 days.

(21) Appl. No.: 17/823,966

(22) Filed: Sep. 1, 2022

(65) Prior Publication Data

US 2023/0083237 A1 Mar. 16, 2023

Related U.S. Application Data

(60) Provisional application No. 63/239,428, filed on Sep. 1, 2021.

(51) Int. Cl.
| | |
|---|---|
| *B25J 9/08* | (2006.01) |
| *B25J 9/16* | (2006.01) |
| *B25J 11/00* | (2006.01) |
| *B25J 19/00* | (2006.01) |

(52) U.S. Cl.
CPC ............ *B25J 9/1605* (2013.01); *B25J 9/08* (2013.01); *B25J 11/0005* (2013.01); *B25J 19/0025* (2013.01)

(58) Field of Classification Search
CPC ...... B25J 11/0005; B25J 19/0025; B25J 9/08; B25J 9/1605
See application file for complete search history.

(56) References Cited

U.S. PATENT DOCUMENTS

| | | | | |
|---|---|---|---|---|
| 11,338,433 | B2* | 5/2022 | Morey | B25J 9/1617 |
| 2008/0125912 | A1* | 5/2008 | Heilman | G06Q 10/06 700/275 |
| 2017/0021503 | A1* | 1/2017 | Kuffner, Jr. | B25J 9/1674 |
| 2019/0176324 | A1* | 6/2019 | Aukes | G06F 30/17 |
| 2019/0351548 | A1* | 11/2019 | Morey | B25J 9/08 |
| 2020/0167631 | A1* | 5/2020 | Rezgui | B25J 9/0084 |
| 2023/0001570 | A1 | 1/2023 | Fox et al. | |

OTHER PUBLICATIONS

International Search Report for corresponding application PCT/IB2022/058217 dated Dec. 23, 2022.

* cited by examiner

*Primary Examiner* — Thai T Dinh
(74) *Attorney, Agent, or Firm* — HEIDI BRUN ASSOCIATES LTD.

(57) ABSTRACT

A method for designing a customized robot to perform a specified function begins by initially creating an electronic library of data about modules and accessories for a robot assembly. The library stores, for each module and accessory, at least firmware for operation and dimensions. Per robot, the method includes receiving a set of functions and requirements of the customized robot, generating design(s) for the customized robot by finding a set of modules or accessories which match at least one of its functions and requirements, based on information in the electronic library, performing a set of validation tests of each design against criteria, identifying the design(s) which passed the set of validation tests, and generating a list of modules and accessories of a selected design and a connection map for the selected design indicating how the modules and accessories are to be connected together to form the customized robot.

8 Claims, 6 Drawing Sheets

METHOD FOR DESIGNING SPECIAL FUNCTION ROBOTS

CROSS REFERENCE TO RELATED APPLICATIONS

This application claims priority from U.S. provisional patent application 63/239,428, filed Sep. 1, 2021, which is incorporated herein by reference.

FIELD OF THE INVENTION

This invention pertains to robotics, and, in particular, to a method of efficiently and quickly designing special function robots.

BACKGROUND OF THE INVENTION

Robots are now ubiquitous and are used for a myriad of purposes in many different industries. There are many current barriers facing the service and personal robot industry. Among them are:
  a) the cost of service robots makes them unaffordable for most enterprises;
  b) it takes an average of 3.5 years and $35 million to develop a mobile, autonomous service robot;
  c) service robots are designed for a specific application and are not configurable;
  d) robots may only function fully when connected to the Internet; and
  e) most robots are reactive, limiting their applicability.

Currently, robots are typically developed from the ground up, one model at a time, for a specific deployment. For each new deployment, new hardware and software are developed. This methodology has proven to be costly, time consuming and inefficient.

In order to meet the demand for the cost sensitive and widely diversified social robotic market, Applicant has created a proprietary technology, described in U.S. patent application Ser. No. 17/849,645, filed Jun. 26, 2020, owned by Applicant and incorporated herein by reference, enabling redeployment of typically 80% of the robot's core "4 pillars" architecture needed for the development of custom social robots for any need, in a fraction of the time and cost of conventionally designed robots.

Reference is now briefly made to FIG. 1A, which is a copy of FIG. 1 of U.S. Ser. No. 17/849,645. FIG. 1 shows the basic architecture of a modular kit 10 from which to generate an intelligent robot. Kit 10 comprises base modules 12, a plurality of functional modules 14, a plurality of accessories 16 and a smart lync hub 11. Each base module 12 and each functional module 14 may comprise a smart connector (not shown) with which to connect to hub 11 which, in turn, may provide both physical connection and communications among base modules 12 and functional modules 14. The modular kit described in U.S. Ser. No. 17/849,645 is flexible, modular, and scalable.

Functional modules 14 may comprise, for example, arms, torso elements (upper, middle and lower), claws, a maintenance device, a cleaning device, a medical device, a cooking device, a personal aid device, a fitness device, a cabinet, a draw, a tray set, etc., some of which are shown in FIG. 1. Accessories 16 may comprise a tray, a cup holder or a keyboard, that connect through proprietary or standard interfaces, and have no smart connector.

Base modules 12 may be housed together in a base housing, thereby forming a base controlling the actions and functions of the robot. Base modules 12 may comprise all the components necessary to operate and control the robot. Accessories, such as wheels, a lidar unit, a keyboard, a display and USB connectors, may also be attached to the base housing. It will be appreciated that any function, accessory and any functional module may be placed anywhere and in any orientation within the generated robot.

FIG. 1B, to which reference is now made, shows an exemplary social robot 20 produced using modular kit 10. Social robot 20 has a head 22, an upper torso 24, a lower torso 26 and a base 28 with wheels 30. Note that in this example, social robot 20 has no arms. Other social robots may have arms.

SUMMARY OF THE PRESENT INVENTION

To achieve these and other objects, the herein device facilitates design of robots for specialized function and operations. There is therefore provided, in accordance with a preferred embodiment of the present invention, a computer assisted method for designing a customized robot for performing a specified function. The method includes receiving, from a customer, a set of functions and requirements of the customized robot to be designed, and, based on information in an electronic library of data about modules and accessories for a robot assembly, said electronic library storing at least firmware for operation of each module and accessory, and dimensions of each module and accessory, generating at least one design for the customized robot by finding a set of modules or accessories which match at least one of the set of functions and requirements. The method also includes based on information in the electronic library, performing a set of validation tests per the at least one design against a set of criteria, identifying the at least one design which passed the set of validation tests to be selected by the customer, and generating a list of modules and accessories of a selected design and a connection map for the selected design indicating how the modules and accessories are to be connected together to form the customized robot.

Moreover, in accordance with a preferred embodiment of the present invention, the method includes identifying all possible designs for the robot assembly using the set of modules or accessories and providing an order to the possible designs according to a specified criterion.

Furthermore, in accordance with a preferred embodiment of the present invention, one of the set of validation tests is a center of mass calculation against a stability region of a base module.

Further, in accordance with a preferred embodiment of the present invention, the customized robot is a social robot whose weight is sufficiently above a floor to interact with a person standing up causing a high center of mass.

Still further, in accordance with a preferred embodiment of the present invention, the set of validation tests includes at least one of connection accuracy, overall design, weight distribution, complexity, number of connections required and connection ports.

Moreover, in accordance with a preferred embodiment of the present invention, the electronic library also stores a unique code for each module and accessory.

Further, in accordance with a preferred embodiment of the present invention, the method includes providing the list and the connection map to a builder to assemble the customized robot.

Still further, in accordance with a preferred embodiment of the present invention, the method also includes providing instructions to the builder to activate the customized robot to perform an initialization after initial connection of its modules and accessories.

Moreover, in accordance with a preferred embodiment of the present invention, each of the modules and accessories includes at least one smart connector for physical connection to and communications with others of the modules and accessories.

There is also provided, in accordance with a preferred embodiment of the present invention, a system for designing a customized robot for performing a specified function. The system includes an electronic library of data about modules and accessories for a robot assembly and a robot design server. The library stores at least firmware for operation of each module and accessory, and dimensions of each module and accessory. The robot design server receives, from a customer, a set of functions and requirements of the customized robot to be designed, generates at least one design for the customized robot by finding a set of modules or accessories which match at least one of the set of functions and requirements, performs, based on information in the electronic library, a set of validation tests per the at least one design against a set of criteria, identifies the at least one design which passed the set of validation tests to be selected by the customer, and generates a list of modules and accessories of a selected design and a connection map for the selected design indicating how the modules and accessories are to be connected together to form the customized robot.

Moreover, in accordance with a preferred embodiment of the present invention, the system includes a robot data server to download module data to the customized robot after assembly and initialization.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
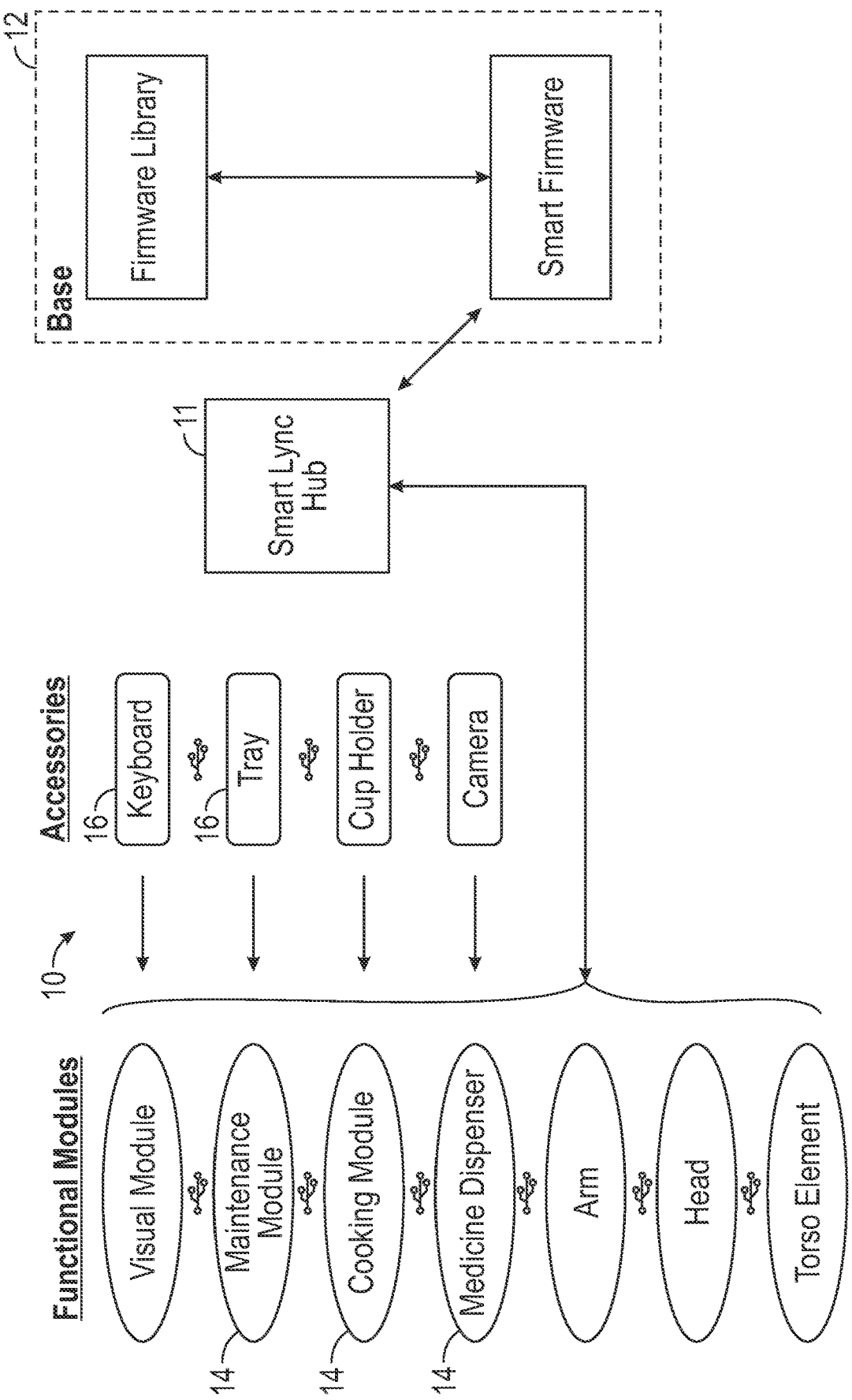
FIG. 1A is a schematic illustration of a modular kit for producing a robot.
Figure 1B:
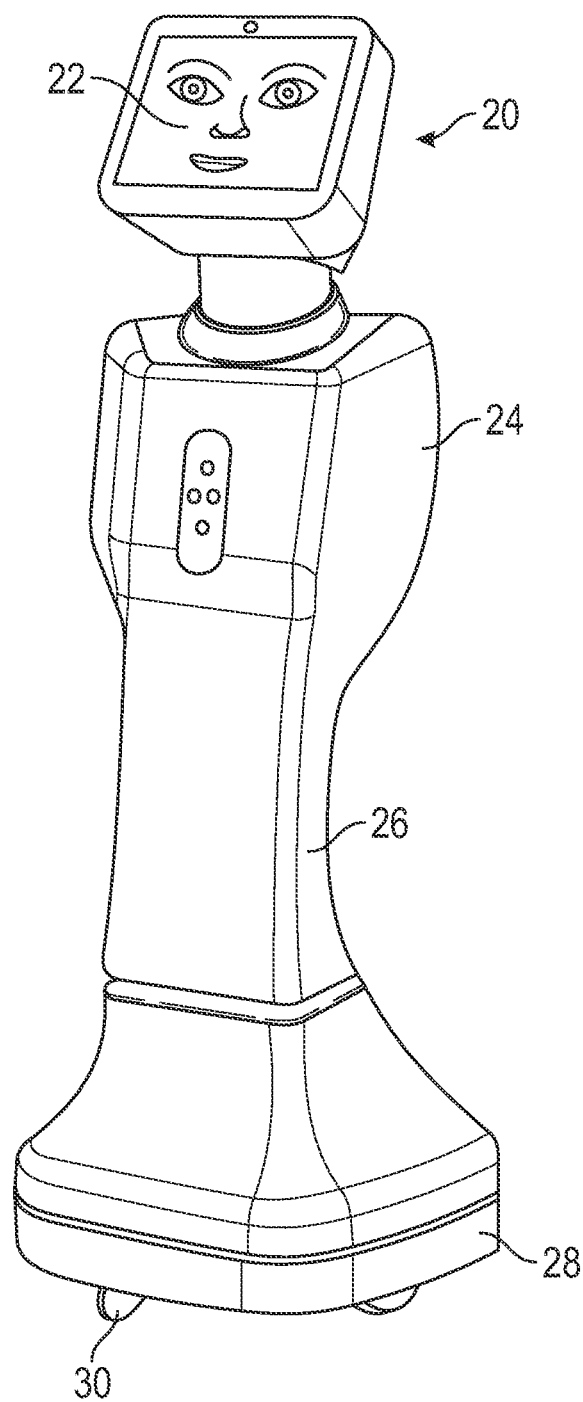
FIG. 1B is a schematic illustration of an exemplary robot produced from the modular kit of FIG. 1A.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that there is a need for a method and system to efficiently and effectively design robots to perform specialized functions or operations. Moreover, Applicant has realized that, in order to meet the demand for diversified social robots at a reasonable cost, social robots need to be designed in a modular fashion. This may enable custom social robots to be built for any need, in a fraction of the time and cost of conventionally designed robots.

Applicant has realized that it may be sufficient for a large percentage, such as 80%, of each robot's architecture to be modular and reusable, requiring the remainder of any robot to be custom designed.

Applicant has realized that the modular kit of U.S. Ser. No. 17/849,645 is flexible, modular, and scalable and may be used to build virtually limitless configurations to satisfy customer deployment objectives by integrating the appropriate sensor packages and by designing mission specific external forms.

Applicant has further realized that there is a need for a method or system that may utilize such a modular kit to efficiently and effectively design robots to perform specialized functions or operations.

Figure 2A:
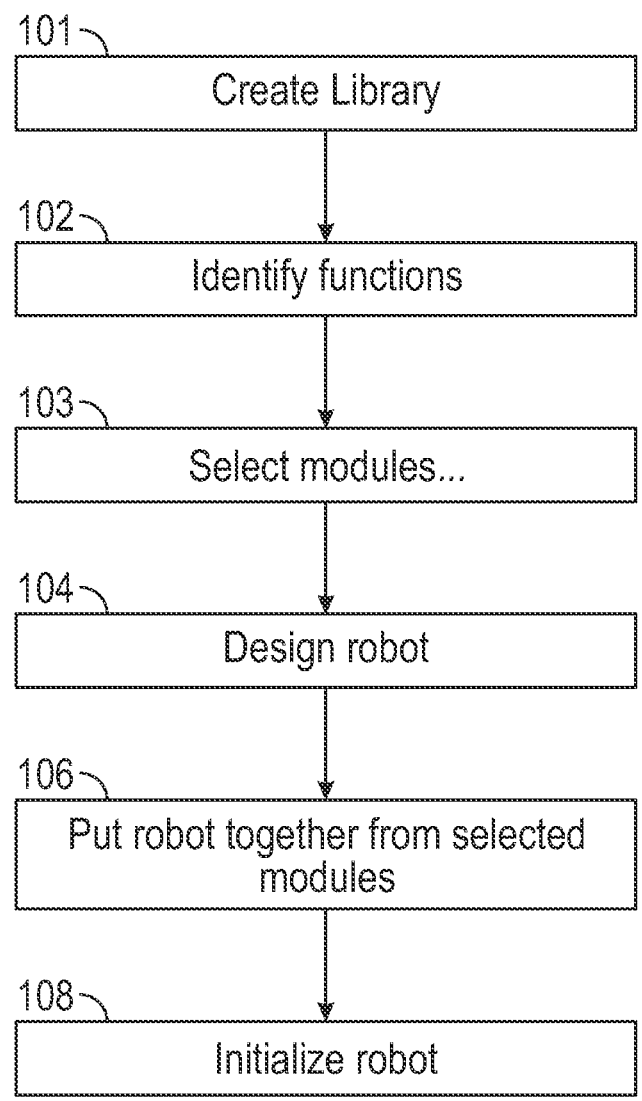
FIG. 2A is a flow chart showing the method of the invention.
Figure 2B:
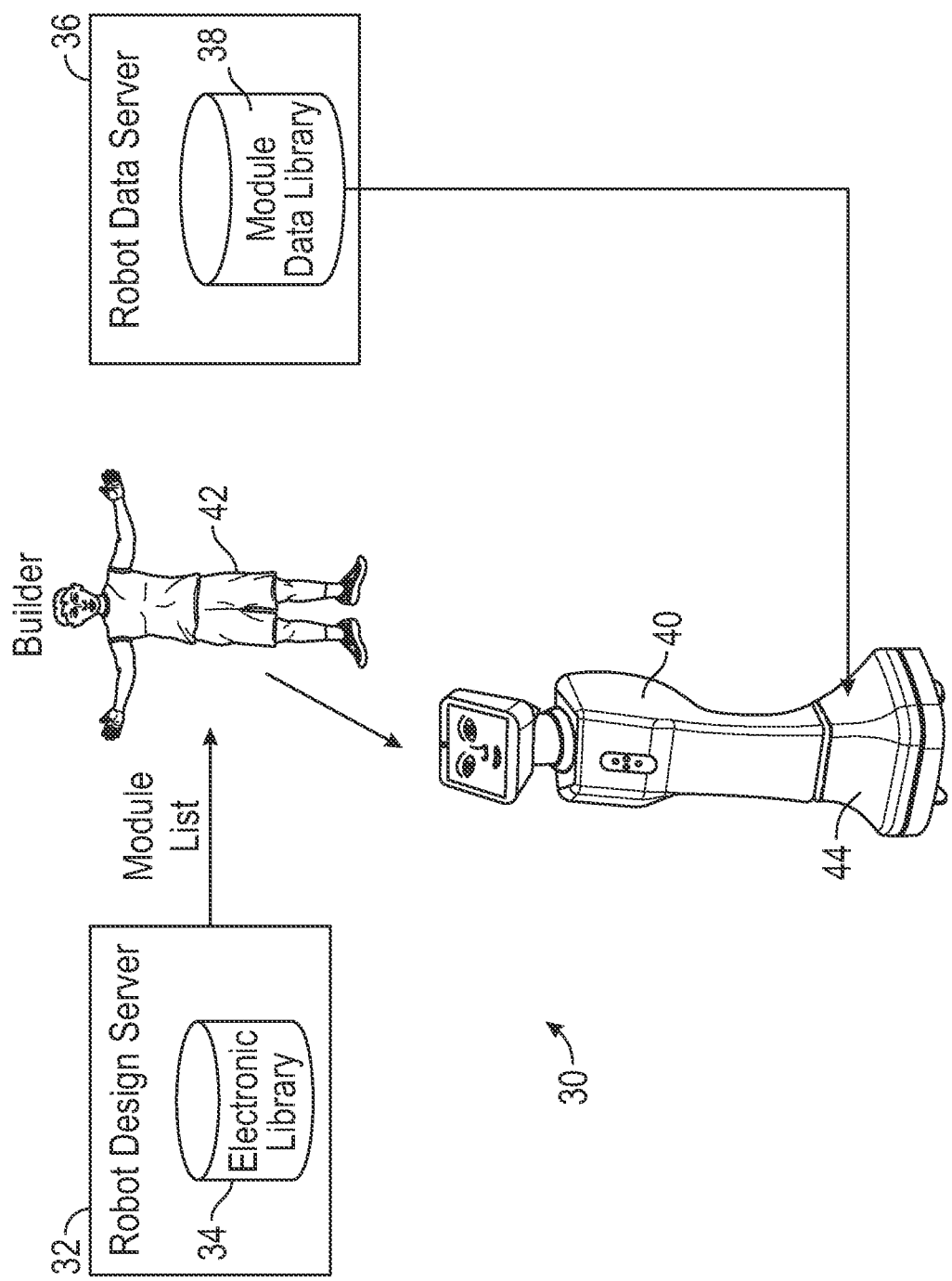
FIG. 2B is a schematic illustration of a system for implementing the method of FIG. 2A.

Reference is now made to FIG. 2A, which illustrates a method facilitating rapid and efficient design of a robot for effecting specified functions and operations, such as those specified by a purchaser, and to FIG. 2B, which illustrates a system for implementing the method of FIG. 2A. The desired robot, having the specified/required functions and features and which may fit the specified needs/wants/desires/budgets, may be ready and functioning in a short time frame, as compared to current practices and technology.

Examples of a short time frame may be within a few days, within a few hours, and within a few minutes. Another time and cost saving measure may be in the manufacture of the social robot. Not having to build and develop each robot as a whole, but rather only the individual modules themselves, may reduce manufacturing time and cost. It may also allow the dispersal of the production of the robot, as a module A may be manufactured in a facility X in country J while a module B may be manufactured in a facility Y in country I, contemporaneously.

The method may be implemented by a robot design facility 30 (FIG. 2B) which may comprise a robot design server 32 storing an electronic library 34 therein, and a robot data server 36 storing a module data library 38.

The method of FIG. 2A may begin by initially creating (step 101) electronic library 34 of data about modules 14 and accessories 16 for a robot assembly, including a unique code for each module and accessory, firmware for operation of each module and accessory, and dimensions of each module and accessory. In other words, the robot design server 32 may catalog the various modules and accessories that could be implemented on a robot. In addition, the robot server 32 may collect all operational and biographic data for the modules 14 and accessories 16 and may associate the collected data with the appropriate module or accessory.

Some possible modules 14 or accessories 16 that may be placed on the robot are, for example, a medication dispenser, an internal printer, an air cleaner, a floor cleaner or a gripping arm. Other examples of possible modules or accessories, for illustrative purposes only and not intended to be limiting, may include: medical devices or equipment, sanitation devices or equipment, transportation devices or equipment, culinary devices or equipment, entertainment devices or equipment, personal health and aid devices or equipment, or any devices or equipment that may benefit from attachment to an intelligent robot.

There may be multiple choices of core and accessory modules. Some modules may serve similar purposes to one another and some modules may serve different purposes to one another. Examples of core modules include: the head, the head extensions, the torso (which may break down to upper torso, mid torso, and lower torso), and the base module 12. Each of these core units may have one unit or many units from which to choose. These core units may also have different orientations from which to select (e.g. a torso with the head placed landscape or portrait, or the torso with a connector on its left vs its right or on its front vs its back, etc.).

Each of the accessory modules 16 may have one unit or many units from which to choose; and, each of these core units may also have different orientations from which to select. The accessory modules 16 may include, for example, arms, claws, a maintenance device, a cleaning device, a medical device, a cooking device, a personal aid device, a fitness device, a cabinet, a draw, a tray set, etc. Each of these modules, both core and accessory, may be made in-house, or may be commissioned for personal company use exclusive by out-house, or third-party individuals or other companies (through licensing or other monetary or non-monetary transactions).

The data stored by electronic library 34 might be a module name and number, a thumbnail image, a revision number, a description, a quality level, whether or not it is OTS (off the shelf), manufacturer, manufacturer part number, vendor, product link, cost, minimum order quantity, vendor quote, lead time, unit of measure (UOM), quantity on hand, inventory location, material, finish, type, manufacturing process, general tolerance, link to CAD (3D—image for modeling) surface area, mass, volume, configuration, project, size in X direction, size in Y direction, and size in Z direction. Module level categories might be connection points, connector type, a mass, a center of mass location, battery consumption, list of functions, features, categories, price, safety and general standards and compliances, color, etc.

The unique code associated with each module may be a simple code incorporating the data and metadata of each part. For example, it may incorporate a module part number, a manufacture part number, or any associated BOM descriptions. The unique code may be used on a robot level during initialization of the final robot.

The design of each robot may begin in step 102, where robot design server 32 may identify the specific functions of a robot assembly to be designed.

In step 103, robot design server 32 may select one or more modules or accessories for the robot assembly. At this junction, server 32 may search electronic library 34 to identify the specific modules and accessories that may perform the identified functions and operations.

In step 104, robot design server 32 may design the robot (a final version of which is shown in FIG. 2B as robot 40. Here robot design server 32, based on information in electronic library 34 and the selected modules and accessories, may design an optimum robot assembly for performing the selected operations and functions.

In step 106, robot design server 32 may provide a module list to a builder 42 who, in turn, may assemble the selected modules and accessories into designed robot 40.

Finally, in step 108, builder 42 may activate designed robot 40 to begin its initialization. As described in U.S. patent application Ser. No. 17/849,645, during initialization, each selected module connects via its smart connector to its base and typically provides its unique ID to the base, here labeled 44. Base 44 may connect to robot data server 36, may provide each unique ID of its modules to robot data server 36, and may request that robot data server 36 download to it, from module data library 38, all data and metadata of its modules.

Figure 3:
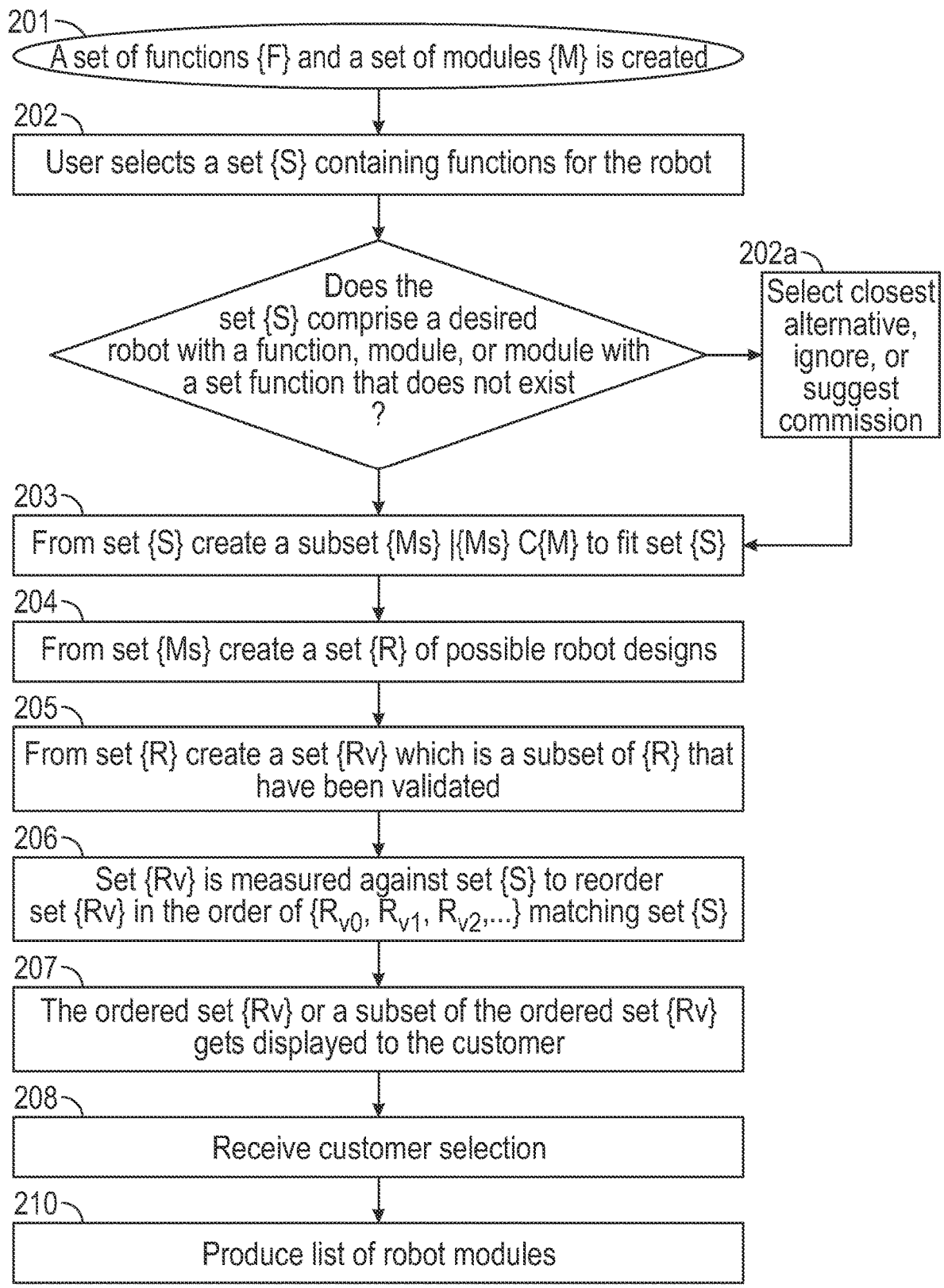
FIG. 3 is a detailed flow chart, showing, in particular, the final step of designing the robot.

FIG. 3 illustrates a more detailed methodology of the method and, in particular, the final step of designing the actual robot. A mathematical model is used to illustrate and explain the method.

In step 201, there is a set of functions $\{F\}$ and a library of a set of modules $\{M\}$ [necessarily also including accessories], wherein each module may have a subset of capable functions $\{f\}$ it may perform, where $\{f\} \subseteq \{F\}$, thereby creating a set $\{M_{\{f\}}\}$ of modules which can perform each function and/or a set of functions $\{F_{\{m\}}\}$ which can be performed by each module.

In step 202, the method may create a set of user selections $\{S\}$ based on user input, where the set $\{S\}$ contains at least one of but not limited to the following: overall robot function $S_{Fo}$ (cook, cleaner, nurse, telepresence, waiter, etc.), overall environment the robot will operate in $S_{Eno}$ (home, hospital, restaurants, malls, offices, etc.), overall budget or individual module budget $S_{Bo}$, look or design $S_{Do}$, specific functions $S_{SFo}$, specific modules $S_{Mo}$, security features $S_{Seco}$, electrical connections and ports $S_{Eleco}$, wired or wireless connection options $S_{Wo}$, charging and battery options $S_{Bato}$, weight, size $S_{Szo}$, or any request, or wants, or needs, or desires that will help the customer find a match.

If any of the selected requirements in user requirements $\{S\}$ does not fit into the current sets $\{F\}$, $\{M\}$, or $\{M_{\{f\}}\}$ or a combination thereof, such as when the requirements/wants/needs/budget/desires/etc. are impossible or improbable to satisfy given the existing set of modules, then the method may move to step 202a where the method may select a closest alternative, may ignore the request, or may suggest a commissioned robot, function, module, or combination thereof.

For example, if the customer wants quality specs for a robot but wants a cheap price, this may not be able to be satisfied, since quality specs often come at a high cost. Or, if the customer desires a very large robot that is also light, nimble and strong, this might only be possible if the robot skin is made of carbon fiber. When what is available is plastic or metal, the requirement may not be able to be satisfied. However, in these cases, close alternative(s) may be possible, by making tradeoffs, such as selecting an alternative matching at least one of the requests/needs/want etc. such as matching the price or matching the specs).

Writing the situation when a set of selected requirements does not exist that satisfy the requirements mathematically yields:

$$S_{Fo} \not\exists \ |F_o \in \{F\}$$

When this is the case, the method may move to step 202a to select a closest alternative, to ignore the request, or to suggest a commissioned function $C_{Fo}$. Mathematically speaking, this can be written: if $S_{Mo} \not\exists \ | \ M_o \in \{M\}$, then select a closest alternative, ignore, or suggest a commissioned function $C_{Mo}$. Alternatively, if $S_{Mo} \exists | \ M_o \in \{M\}$ and $S_{Fo} \exists \ F_o \in \{F\}$ but $S_{Mo} \not\exists \ | \ M_{Fo} \in \{M_F\}$, then select a closest alternative, ignore, or suggest a commissioned function for module $C_{MfO}$.

In step 203, the method may search the electronic library of data from steps 101 and 102, comparing each requirement from the requirement set {S} against the data and/or metadata associated with each module {M}. The method may eliminate all modules or functions or both that do not fit or match any of user requirements {S}. (For example: if $S_{Fo}$ is the medical field, then modules that function only in a culinary field are not relevant; in another example, if $S_{Bo}$ has a cost level of X, a module costing 100×is not relevant). The result may be either or both of a matched module subset $\{M_{\{f\}o}\}$ from modules $\{M_{\{f\}}\}$ or a matched function subset $\{F_{\{m\}}\}$ from functions $\{F_{\{m\}}\}$ that fit(s) user requirements {S}.

In step 204, from matched module subset $\{M_{\{f\}o}\}$ and/or from matched function subset $\{F_{\{m\}o}\}$, the method may create a set {R} of robot designs made up of modules and functions that fit the user requirements {S}.

Thereafter, at step 205, the method performs validation tests against a set of criteria on the set {R} of robot designs. The set of criteria may be connection accuracy, overall design, weight distribution, complexity, number of connections required and connection ports, and any other means needed to check if the robot resulting from each robot design will be functional. In addition, each design is required to have at least one core module (which may be a base module or any other type of core module) The output of step 205 is a set of robot designs that have passed the validation check.

For example, the test may comprise a set of checks that may increase in complexity as the test continues. At the end of each check, the method may generate a "passed" subset $\{R_{passed}\}$ of robot designs {R} that have passed the test and may perform subsequent checks only on passed subset $\{R_{passed}\}$. This may continue until all the checks are gone through one by one. This may bring benefit in saving on computational time and effort as more complex checks may happen only on smaller subsets of robot designs {R}.

The earlier checks may be simple things like basic connection requirements (for example: a hand may not be attached to a robot before the arm the hand would connect to is connected to the robot (i.e. connection order matters)). The later checks may run more complex calculations for more complex criteria (for example, and as described in more detail hereinbelow, checking that an estimated weight distribution relative to a robot's center of mass is within an acceptable region). Other checks may check the casing, molding, and skeleton of the robot (for example: if the module needs a slim casing, then an unusually shaped or bulky module might receive a low score). Another check may consider bias toward standard designs (for example, a head connected into a neck connected into a top of a torso and a claw on a right arm is more likely than a head connected into a neck connected into a right arm and a claw on a top of a torso). The output of step 205 may be a set of robot designs $\{R_V\}$ that have passed the validation tests, where $\{R_V\}\exists\{R\}$.

Step 205 may be partly integrated into step 204. For example, earlier low complexity checks of the test may be done in order to create the initial set {R} of robot designs in step 204 and later, high complexity checks of the test may be done in order to create validated robot designs $\{R_V\}$ in step 205. In this sense, step 204 and step 205 may be considered two parts of a single step.

It will be appreciated that the center of mass calculation is especially important for social robots, since social robots interact with people and therefore, portions of the robot, such as such as a screen and or touch pad, are typically located close to average human height to properly interact with people. The result is a robot with a high center of mass (i.e. a robot whose weight is significantly above the floor in order to interact with a person standing up).

The high center of mass typically causes a large torque on the base and on its contact with the ground. The higher the torque is, the greater any impact force will have on rotational motion, which could, for example, cause a robot to topple over. Thus, the method may attempt to maintain the center of mass and the stability region of the base as large as possible. This may be helped by selecting a heavier base.

This is of particular importance if a customer were to request an unusual height for a robot. For example, a customer might request a social robot for basketball players and would like the robot to have a high screen to accommodate these players. The center of mass calculation would enable the method to chose a base with a higher weight (to lower the center of mass), a wide area of stability region, and a center of mass generally vertically above the stability region.

Figure 4:
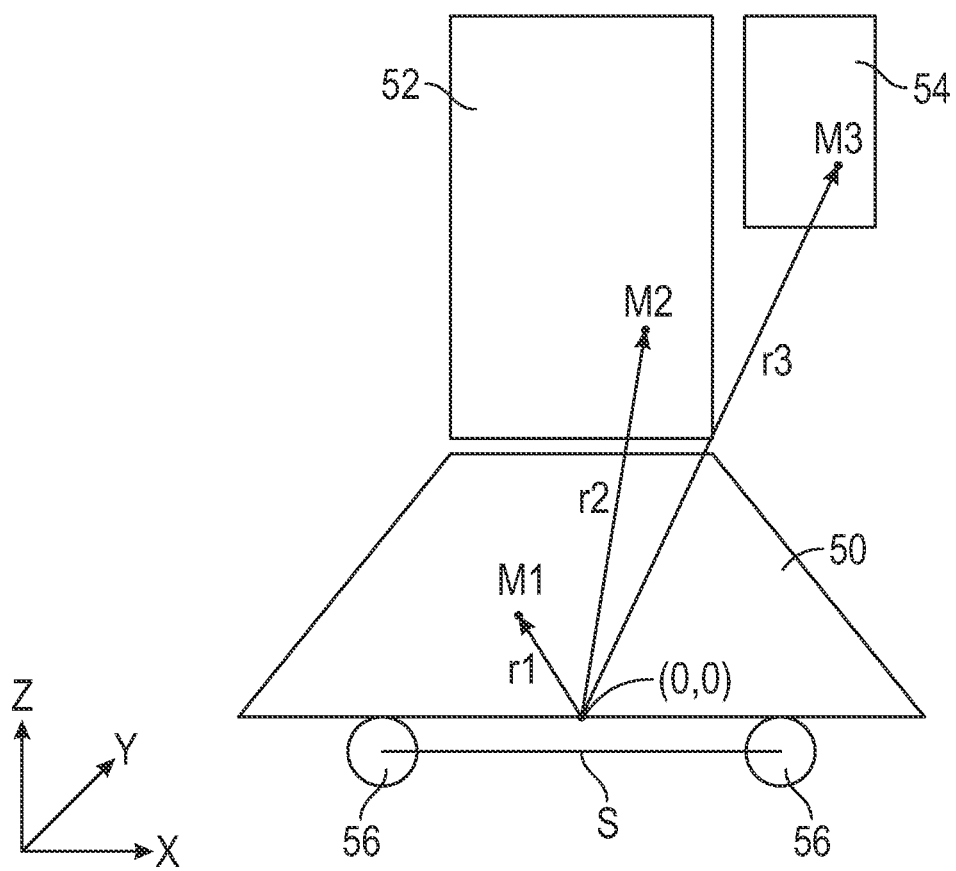
FIG. 4 is a schematic illustration of a center of mass calculation, useful in the method of FIG. 2A.

Reference is now made to FIG. 4, which illustrates the exemplary weight distribution calculation, performed per robot design. FIG. 4 shows a robot assembly having three modules, a base 50, a torso 52 and an arm 54, shown two-dimensionally, in an X-Z plane. Base 50 has two wheels 56, separated by a distance S. Each module has a mass $M_i$ and a radius $r_i$ to its center of mass, from an origin (0,0) centrally located between wheels 56, where i=1 is base 50, i=2 is torso 52 and i=3 is arm 54.

To determine the center of mass of the robot assembly of FIG. 4, the method may perform the following calculation to determine the robot center of mass (RCM) in the X-Z plane:

$$RCM_{x-z} = \frac{\sum_i M_i r_i}{\sum_i M_i} \quad (1)$$

The method may perform this calculation for each of the X-Z, X-Y and Y-Z planes or, alternatively, may implement this calculation as a 3-D vector calculation.

Base 50 may also have data on its stability region and the amount of weight it can support. The method may check that the location of the calculated center of mass RCM is within the stability region of the base module. Otherwise, the robot design will not be viable. In the example of FIG. 4, the stability region in the X direction may be between wheels 56 (i.e., within S). This may be true for the Y direction as well, depending on the placement of any other wheels 56.

In the Z direction, the calculated center of mass $RCM_z$ may be above the stability region. The higher calculated center of mass $RCM_z$ is, the more the robot is susceptible to falling. Here, what is desired is that the center of mass generally be as close as possible to vertically above the center of the stability region (i.e. above origin (0,0)).

The use of stabilizers, gyroscopes, control systems, etc., may extend the stability region beyond the region between the wheels.

At step 206, the method may measure how close each robot design of verified set $\{R_V\}$ matches user requirements 1S and may organize the designs in the set based on the match. The measurement may be any suitable measurement, such as a weighted measurement. The method may sum the total measurements and may give each weighted measurement a score which is a percentage of the total measurements. The method may order the verified robot designs $\{R_V0, R_V1, R_V2, \ldots\}$ according to their score values, typically with the robot design with the highest score being the first design in the set.

The method may calculate closeness by determining the number of requests/wants/etc. which were reached compared to the number of requests/wants/etc. which were not reached. In addition, the method may calculate how far each failed request/want/etc. was, such as giving less weight to the failed requests/wants/etc. vs. giving more weight to the others.

The method can also weight according to how well each request/want/etc. was satisfied (for example, if a weight request was for under 25 kg, then a robot with 20 kg will have a greater score than a robot with 24.5 kg for this particular field, or alternatively, if weight request was for 25 kg then a robot with 20 kg will have a lower score than a robot with 24.5 kg as it is closer to the requested goal). In general, when a request has a range of values, a result which is closer to the center of the range may score higher than a result which is further from the center of the range. For costs, the lower result may be scored higher while, for specs, the higher the value, the higher the weighting.

The method may generate a score for each request/want/etc. and the method may generate a total score, indicating how well the robot design compares to the overall request, from an average or a weighted average of all the scores. The method may present the scores to the customer as a list, as a truncated list (ex. The top 1, the top 3, the top 10) or as a tier list where a range of scores may be are categorized into tier. (for example, out of a score of 100, a score of 95-100 may be in the S, a score of 90-95 may be in an A tier, etc.).

The weighted measurement may be weighted manually by the customer, weighted manually by the robot manufacturer or sellers or weighted manually by the system itself, based on past customer experience. For example, the system may determine that weighting a selected function leads to more closed sales, customer satisfaction, engagement, shares, etc.; or, weighing a selected budget more may lead to more closed sales, customer satisfaction, engagement, shares, etc.; or the system may take a combination of factors into account using machine learning.

The now ordered set $\{R_V\}$ of validated robot designs may be displayed to the customer (step 207) in any suitable order, such as: a list from best match to worst match, a list from worst match to best match, tiers of matches from best to worst, and tiers of matches from worst to best, or any common or known means of displaying ordered information to a customer.

At step 208, the method may receive a customer selection from the ordered set $\{R_V\}$ of validated robot designs for order, purchase, rent, etc.; or, it may receive manual edits to a selection as per its requirements; or, if unsatisfied with the results, may return to step 202 and may reinput functional or operational requirements; or, if unsatisfied with the results, may return to step 202a and may commission a desired robot or module.

If the customer decides to return to step 202, this may be taken into account in the next iteration when weighting the factors in step 206 to better give desired outcomes for the customer for step 207.

In step 210, the method may produce a list of robot modules for the selected robot, along with a connection map indicating how the modules are to be connected. In addition, the method may produce a visual representation of the robot assembly as a visual aid to builder 42 (FIG. 2B). The method may also produce a customer visual aid to aid in selection, whether the latter may be focused on the aesthetic beauty of the constructed robot.

The robot module list may comprise instructions to builder 42 as to how to connect the modules together, such as via the smart connectors described in U.S. patent application Ser. No. 17/849,645. The robot module list may also comprise instructions to builder 42 to start robot 40, after builder 42 has connected the modules together, so that robot 40 may perform its initialization. The initialization process typically involves connecting the various modules together, such as via their smart connectors, and building a connection map therefrom. It may also involve transferring data from at least some of the modules to the base.

In addition, as described in U.S. Patent Application 63/310,120, when robot 40 may first start up, it may have its unique ID stored therein. Once robot 40 starts up for the first time, it may read its unique ID and may transmit that ID to robot data server 36. Based on this, robot data server 36 may then download to robot 40 whatever data robot 40 may need in order to function.

The initialization may or may not include the addition of a data download into a storage unit in the base module. This may include general data, field specific data, feature specific data, or function specific data, etc. In addition, if the robot is associated with a specific company or customer, their specific or unique data may be downloaded.

An example of the data used in the method of FIGS. 2A and 3 is presented below:

Step 101: Library of modules listing modules, their unique code, their data and their metadata. An exemplary library might be similar to that listed in Table 1, below:

TABLE 1

| modules: | Unique code: | Information: |
|---|---|---|
| Base | 1000 | one size fits all |
| Torso | 1001 | for height 130, 160 robots |
| Head (portrait) | 1002 | |
| Head (landscape) | 1003 | have 13 inch and 15 inch |
| camera extension (in development) | 1004 | attached as accessory to head for easier telepresence |
| trays | 1005 | size X weight Y |
| cabinets | 1006 | size X weight Y |
| pill dispenser (in development) | 1007 | size X weight Y |

Step 102: Status codes for the modules

| | |
|---|---|
| Not relevant | 0 |
| Suggested | 1 |
| Useable | 2 |

$\{M_{\{f\}}\}$: Exemplary modules and their functions

| Module | Component | Feature | status |
|---|---|---|---|
| head | portrait | Follow me | 1 |
| | | Telepresence | 1 |
| | | transport food | 0 |
| | | transport medicine | 0 |
| | landscape | Follow me | 1 |
| | | Telepresence | 2 |
| | | transport food | 0 |
| | | transport medicine | 0 |

-continued

| Module | Component | Feature | status |
|---|---|---|---|
| torso | tray version | Follow me | 0 |
| | | Telepresence | 0 |
| | | transport food | 1 |
| | | transport medicine | 2 |
| | cabinet version | Follow me | 0 |
| | | Telepresence | 0 |
| | | transport food | 1 |
| | | transport medicine | 1 |
| base | | Follow me | 1 |
| | | Telepresence | 1 |
| | | transport food | 1 |
| | | transport medicine | 1 |

Alternatively, $\{F_{\{m\}}\}$: Exemplary functions and the modules to implement them

| Features | Module | Component | status |
|---|---|---|---|
| Follow Me | Head | Portrait | 1 |
| | | Landscape | 1 |
| | Torso | Cabinet version | 0 |
| | | tray version | 0 |
| | Base | | 1 |
| Telepresence | Head | Portrait | 1 |
| | | Landscape | 2 |
| | Torso | Cabinet version | 0 |
| | | tray version | 0 |
| | Base | | 0 |
| Transport food | Head | Portrait | 0 |
| | | Landscape | 0 |
| | Torso | Cabinet version | 2 |
| | | tray version | 1 |
| | Base | | 1 |
| Transport medicine | Head | Portrait | 0 |
| | | Landscape | 0 |
| | Torso | Cabinet version | 1 |
| | | tray version | 2 |
| | Base | | 1 |

Step 201: uses the libraries of step 101 and step 102.
Step 202:
What is your budget?
  Ex. $X
What is the field of operation of the robot?
  Ex. Medical
what do you want the robot to do?
  Ex. Service patients with simple tasks
What are must have features of the robot?
  Ex. ability to carry items and communicate [and entertain] with patients
what are nice to have features to have?
  Ex. interactive screen for entertainment and ability to sterilize items
what are things you absolutely don't want the robot to have?
  Ex. Touch screen
Want the head landscape? Portrait?
  Ex. No Preference
Trays or shelves?
  Ex. Trays
have measurement requirements? Weight?
  Ex. between 120-180 cm, weight>30 kg
Step 202a:
The method's response might be: we don't have entertainment options; would you like to commission a module with this feature?

Step 203: Selected subset of modules $\{M_s\}$

| | |
|---|---|
| Base | 1000 |
| Torso | 1001 |
| Head (portrait) | 1002 |
| Head (landscape) | 1003 |
| trays | 1005 |
| pill dispenser | 1007 |

Step 204: Possible robot designs R1-R4

| R1: | | R2: | |
|---|---|---|---|
| Base | 1000 | Base | 1000 |
| Torso | 1001 | Torso | 1001 |
| Head (landscape) | 1003 | Head (landscape) | 1003 |
| trays | 1005 | trays | 1005 |
| pill dispenser | 1007 | pill dispenser | 1007 |

| R3: | | R4: | |
|---|---|---|---|
| Base | 1000 | Base | 1000 |
| Torso | 1001 | Torso | 1001 |
| Head (landscape) | 1003 | Head (portrait) | 1002 |
| trays | 1005 | trays | 1005 |

Step 205: Validated robot designs—R3 and R4

| R3: | | R4: | |
|---|---|---|---|
| Base | 1000 | Base | 1000 |
| Torso | 1001 | Torso | 1001 |
| Head (landscape) | 1003 | Head (portrait) | 1002 |
| trays | 1005 | trays | 1005 |

Step 206: Scoring

| | |
|---|---|
| R3: | 83% |
| R4: | 75% |

Step 207: Order of scores
R3, R4 (ordered)
Step 208:
customer picks R3

As can be seen, the present invention may provide a method and system of designing special function robots from a modular kit to meet a set of user requirements and validation criteria. It will be appreciated that the present robot design method results in a significantly faster manufacturing time for customized robots.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a server, a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer assisted method for designing a customized human interacting robot for performing a specified function, the method comprising the steps of:

receiving, from a customer, a set of functions and requirements of said customized human interacting robot to be designed, wherein at least one of said requirements is for at least one interactive portion of said human interacting robot to be close to a human height;

based on information in an electronic library of data about modules and accessories for a robot assembly, said electronic library storing at least firmware for operation of each module and accessory, and dimensions of each module and accessory, generating at least one design for said customized human interacting robot by finding a set of modules or accessories which match at least one of said set of functions and requirements, wherein said set of modules or accessories comprises at least a base module;

based on information in said electronic library, performing a set of validation tests per said at least one design against a set of criteria, wherein at least one of said validation tests is a center of mass calculation against a stability region of said base module;

identifying said at least one design which passed said set of validation tests to be selected by said customer; and generating a list of modules and accessories of a selected design and a connection map for said selected design indicating how said modules and accessories are to be connected together to form said customized human interacting robot.

2. The method according to claim 1, further comprising the step of identifying all possible designs for the robot assembly using said set of modules or accessories and providing an order to said possible designs according to a specified criterion.

3. The method of claim 1 and wherein said set of validation tests comprises at least one of connection accuracy, overall design, weight distribution, complexity, number of connections required and connection ports.

4. The method according to claim 1 and wherein said electronic library also stores a unique code for each module and accessory.

5. The method according to claim 1 and also comprising providing said list and said connection map to a builder to assemble said customized human interacting robot.

6. The method according to claim 5 and also comprising said providing instructions to said builder to activate said customized human interacting robot to perform an initialization after initial connection of its modules and accessories.

7. The method according to claim 1 and wherein each of said modules and accessories comprises at least one smart connector for physical connection to and communications with others of said modules and accessories.

8. The method of claim 1 and also comprising organizing said validation tests according to complexity and, at each complexity level, performing said validation tests only on robot designs that have passed the validation tests of previous complexity levels.

* * * * *